United States Patent Office 3,061,634
Patented Oct. 30, 1962

3,061,634
HALO AND PHENYL SUBSTITUTED PHENYL LOWER ALKYL CARBINOL MONO ESTERS OF SUCCINIC, GLUTARIC, AND MALEIC ACIDS
Giuseppe Palazzo, Rome, Italy, assignor to Francesco Angelini (trading as the firm Aziende Chimiche Ruinite Francesco Angelini), Rome, Italy
No Drawing. Filed Feb. 8, 1960, Ser. No. 7,114
Claims priority, application Great Britain Feb. 17, 1959
17 Claims. (Cl. 260—485)

This invention relates to alkyl-aryl carbinol derivatives.

Alkyl-aryl carbinols have been described which have the general Formula I:

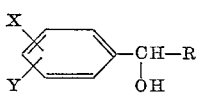

where X and Y represent a hydrogen or halogen atom, an alkyl or aryl group or an alkoxy or aryloxy group, while R represents a straight or branched alkyl chain residue of from 2 to 5 carbon atoms, or a cycloalkyl residue. The said alkyl-aryl carbinols have no known useful biological activity.

The compounds may be prepared by reduction of the corresponding alkyl-aryl ketones, for example with aluminum isopropylate (Meerwein-Ponndorf method) or by catalytic hydrogenation in the presence of the appropriate catalyst (for example, platinum or Raney nickel), or with sodium borohydride, $NaBH_4$, or with lithium aluminium hydride, bearing in mind when choosing the reduction method the influence which the reducing agents may have on the constituents X.

The compounds may likewise be prepared by the reaction of alkyl magnesium halides of general formula:

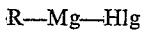

where Hlg represents chlorine, bromine, or iodine, and R has the meaning given above, with aldehydes of the general formula:

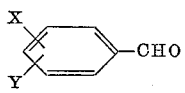

where X and Y have the meaning given above, in appropriate solvents or inert diluents.

Alternatively, with respect to the second method, the compounds may be prepared by reacting aryl-magnesium halides of the general formula:

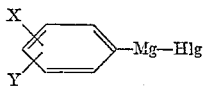

where X, Y and Hlg have the meanings assigned to them above, with aliphatic aldehydes of the general formula:

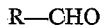

where R has the meaning assigned to it above, in appropriate solvents or inert diluents.

It has now been discovered, however, that the monoesters of such alkyl-aryl carbinols formed with succinic, glutaric and maleic acids possess interesting hypocholesterolemic properties.

According to the present invention, therefore, there are provided monoesters of the general Formula II:

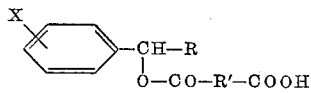

where X, Y and R have the meanings assigned to them above and R' represents one of the groups:

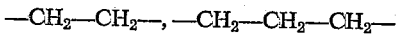

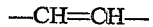

According to a further feature of the invention the said compounds of general Formula II are prepared from the carbinols of general Formula I by methods known per se for obtaining the monoesters of aliphatic dicarboxylic acids.

According to one preferred form of the invention, the compounds of general Formula II are prepared by the reaction of the alkyl-aryl carbinols of general Formula I with equimolar quantities of succinic, glutaric or maleic anhydride at temperatures between about 70 and 160° C., preferably between about 110 and 140° C., in the presence or absence of solvents. Solvents suitable for use in the reaction in question are, for example, pyridine and its homologues; aromatic hydrocarbons, for example, benzene, toluene and, in particular, xylene; and chlorinated hydrocarbons and other organic solvents which are inert with regard to the reagents.

At the completion of the reaction, which in general proceeds for several hours, the monoesters formed are isolated from the reaction mixture by distillation of the solvent and subsequently purified from the secondary non-acid components by dissolving in a dilute aqueous solution of an alkali carbonate or bicarbonate, followed by reprecipitation with mineral acids. Where pyridine (or a homologue thereof) is employed as solvent, it may be removed from the reaction product by treatment with dilute mineral acids; the residue may thus be purified by way of its alkaline salts. The treatment with dilute aqueous solution of alkaline carbonate or bicarbonate may likewise be effected directly on the reaction mixture, with the object of extracting from it the monoesters, which are then isolated in the usual manner.

The monoesters obtained by acidification of the aqueous solutions of their alkaline salts form oils which in general solidify spontaneously as crystals, for the most part of low melting point. They are recrystallizable from hexane, petroleum ether or the like.

The monoesters of the general Formula II thus prepared, when administered endoperitoneally or orally in doses of from 5 to 200 mg./kg. to rats with experimental hypercholesterolemia from triton or cortisone, cause a notable diminution of the amount of cholestrol in the blood. Such a diminution is due only in part to a major elimination through the biliary duct consequent to an increase in bile. In vitro experiments on hepatic rat tissue, using as substrate either (1) $C^{14}$ acetate or (2) $C^{14}$ mevalonate (technique of Cornforth, J. W.; Hunter, C. D.; Popjak, G.; Bioch. J., 1953, 54, 597–601), indicate that the monoesters of this invention have the property of inhibiting the biosynthesis of cholesterol. Thus they are of potential pharmaceutical value in geriatrics.

The following examples will serve to illustrate the invention:

EXAMPLE I

1-Phenylpentyl Acid Succinate 16.4 g. of 1-phenyl pentanol and 10 g. of succinic anhydride are warmed for eight hours with 20 ml. of anhydrous pyridine at 115° C. The reaction mixture is cooled, treated with 2 N HCL and extracted with chloroform. It is washed with water and the solvent is then eliminated. The residue is treated with a slight excess of 10% $Na_2CO_3$ and the impurities extracted with ether. The alkaline solution is treated with HCl and the oil which separates is extracted with ether. This is dried over $Na_2SO_4$ and the ether eliminated, leaving an oil which soon solidifies in 21.3 g. yield, M.P. 50–53° C. After two recrystallizations from petroleum ether, the M.P. is raised to 54° C.

Analysis for $C_{15}H_{20}O_4$: Calcd.: Percent C=68.16; H=7.63. Found: Percent C=68.27; H=7.67.

EXAMPLE II

*1-p-Chlorophenyl-2-Methyl-Propyl Acid Succinate*

4.6 g. of 1-p-chlorophenyl-2-methyl-propanol, 2.5 g. of succinic anhydride and 30 ml. of xylene are heated at 120° C. for eight hours. The reaction mixture is cooled, treated with water and the layers are separated. The xylene layer is dried over $Na_2SO_4$ and extracted with ether. The alkaline solution is acidified with dilute HCl and an oil separates which soon solidifies, yielding 4 g. of colorless substance which, after crystallizing from hexane, melts at 97–98° C.

Analysis for $C_{14}H_{17}ClO_4$: Calcd.: percent C=59.05; H=6.01. Found: percent C=58.54; H=5.88.

EXAMPLE III

*1-(4-Diphenylyl)-Propyl Acid Glutarate*

7.5 g. of 1(4-diphenylyl)-propanol, 4 g. of glutaric anhydride and 7.5 ml. of anhydrous pyridine are heated for eight hours at 125° C. The reaction mixture is cooled, treated with 2 N HCl and extracted with chloroform. It is then washed with water and the solvent eliminated. The oily residue is treated with a solution of 10% $Na_2CO_3$. The alkaline solution is extracted with ether and then acidifed with dilute HCl. An oil separates which is extracted with ether. The ether layer is dried over $Na_2SO_4$ and the solvent eliminated. The oily residue solidifies after a few days to yield 6 g. of substance which, crystallized from hexane, melts at 56–57° C.

Analysis for $C_{20}H_{22}O_4$: Calcd.: percent C=73.60; H=6.79. Found: percent C=73.44; H=6.90.

EXAMPLE IV

*1-Phenylpentyl Acid Maleate*

5.5 g. of 1-phenylpentanol, 3.3 g. of maleic anhydride and 40 ml. of xylene are heated for 7 hours at 120° C. The reaction mixture is cooled and treated with water. The xylene layer is dried over $Na_2SO_4$ and then evaporated at reduced pressure. The residue is taken up in a solution of 7% $Na_2CO_3$ and ether. After acidification of the alkaline solution, an oil separates which is extracted with ether. This is dried and the solvent eliminated. There remain 3.6 g. of a very dense oil which is analyzed as such and is the acid maleate of 1-phenylpentane.

Analysis for $C_{15}H_{18}O_4$: Calcd.: percent C=68.68; H=6.92. Found: percent C=68.35; H=7.07.

EXAMPLE V

*1-p-Chlorophenyl-2-Methyl-Propyl Acid Maleate*

3.3 g. of maleic anhydride, 6.1 g. of 1-p-chlorophenyl-2-methyl-propanol and 40 ml. of xylene are heated for 7 hours at 120° C. The reaction mixture is cooled and treated with water. The organic layer is dried over $Na_2SO_4$ and then evaporated at reduced pressure. The residue is taken up in a solution of 5% $Na_2CO_3$ and ether. After acidification of the alkaline solution, there separates an oil which is extracted with ether. This is dried and the solvent eliminated to give 4 g. of substance which solidifies after a few days. After two crystallizations from hexane, the M.P. is 75–76° C.

Analysis for $C_{14}H_{15}ClO_4$: Calcd.: percent C=59.47; H=5.34. Found: percent C=59.49; H=5.20.

The following compounds were prepared by the techniques described in the foregoing examples using appropriate starting materials:

1-p-fluorophenylpropyl acid succinate, M.P. 54° C.:
    Analysis for $C_{13}H_{15}FO_4$: Calcd.: percent C=61.41; H=5.95. Found: percent C=61.44; H=6.21.

1-p-chlorophenylpropyl acid succinate, M.P. 71° C.:
    Analysis for $C_{13}H_{15}ClO_4$: Calcd.: percent C=57.89; H=5.60. Found: percent C=58.03; H=5.75.

1-p-iodophenylpropyl acid succinate, M.P. 76–77° C.:
    Analysis for $C_{13}H_{15}IO_4$: Calcd.: percent I=35.04. Found: percent I=35.04.

1-p-chlorophenyl-2-methylpropyl acid glutarate, oil:
    Analysis for $C_{15}H_{19}ClO_4$: Calcd.: percent C=60.30; H=6.56. Found: percent C=60.38; H=6.36.

1-phenylpentyl acid glutarate, oil:
    Analysis for $C_{16}H_{22}O_4$: Calcd.: percent C=69.04; H=7.97. Found: percent C=69.12; H=7.94.

1-p-tolylpentyl acid succinate, oil:
    Analysis for $C_{16}H_{22}O_4$: Calcd.: percent C=68.16; H=7.63. Found: percent C=68.45; H=7.82.

1-(4-diphenylyl)-pentyl acid succinate, M.P. 80° C.:
    Analysis for $C_{21}H_{24}O_4$: Calcd.: percent C=74.09; H=7.11. Found: percent C=74.06; H=7.13.

1-p-chlorophenylpentyl acid succinate, M.P. 38.9° C.:
    Analysis for $C_{15}H_{19}ClO_4$: Calcd.: percent Cl=11.86. Found: percent Cl=11.72.

1-(4-diphenyl)-propyl acid succinate, M.P. 66–67° C.:
    Analysis for $C_{19}H_{20}O_4$: Calcd.: percent C=73.06; H=6.45. Found: percent C=73.32; H=6.75.

1-(2',4'-dichlorophenyl)-pentyl acid succinate, oil:
    Analysis for $C_{15}H_{18}Cl_2O_4$: Calcd.: percent Cl=21.28. Found: percent Cl=21.47.

Cyclohexyl: p-chlorophenyl carbinol acid succinate, M.P. 136° C.:
    Analysis for $C_{17}H_{21}ClO_4$: Calcd.: percent Cl=10.92. Found: percent Cl=10.97.

Cyclopentyl: p-chlorophenyl carbinol acid succinate, M.P. 95° C.:
    Analysis for $C_{16}H_{19}ClO_4$: Calcd.: percent Cl=11.41. Found: percent Cl=11.65.

1-p-chlorophenylpentyl acid glutarate, oil:
    Analysis for $C_{16}H_{21}ClO_4$: Calcd.: percent Cl=11.33. Found: percent Cl=11.40.

1-p-bromophenylpentyl acid succinate, M.P. 53–54° C.:
    Analysis for $C_{15}H_{19}BrO_4$: Calcd.: percent Br=23.28. Found: percent Br=23.50.

1-p-chlorophenylhexyl acid succinate, oil:
    Analysis for $C_{16}H_{21}ClO_4$: Calcd.: percent Cl=11.33. Found: percent Cl=11.21.

1-p-chlorophenyl-4-methylpentyl acid succinate, oil:
    Analysis for $C_{16}H_{21}ClO_4$: Calcd.: percent Cl=11.33. Found: percent Cl=11.03.

1-p-iodophenylpentyl acid succinate; M.P. 88–89° C.:
    Analysis for $C_{15}H_{19}JO_4$; Calcd.: percent J=32.52. Found: percent J=32.30.

I claim:
1. A compound of the formula

$$\begin{array}{c} X \\ \diagdown \\ \phantom{X}\phantom{X} \\ Y \diagup \end{array} \!\!\!\!\!\!\! \bigcirc \!\!\!\!\!\!\! \begin{array}{c} -CH-R \\ | \\ O-CO-R'-COOH \end{array}$$

in which X and Y are each selected from the group consisting of hydrogen, fluorine, chlorine, bromine and iodine atoms, and a phenyl group with Y being other than hydrogen when X is hydrogen, R is selected from the group consisting of an alkyl radical containing from 2–5 carbon atoms, a cyclopentyl radical and a cyclohexyl radical, and R' is selected from the group consisting of $-CH_2-CH_2-$, $-CH_2-CH_2-CH_2-$ and $-CH=CH-$ radicals.

2. 1-(p-chlorophenyl)-2-methylpropyl acid succinate.
3. 1-(4-diphenylyl)-propyl acid glutarate.
4. 1-p-chlorophenyl-2-methylpropyl acid maleate.
5. 1-p-fluorophenylpropyl acid succinate.
6. 1-p-chlorophenylpropyl acid succinate.
7. 1-p-iodophenylpropyl acid succinate.
8. 1-p-chlorophenyl-2-methylpropyl acid glutarate.
9. 1-(4-diphenylyl)-pentyl acid succinate.

10. 1-p-chlorophenylpentyl acid succinate.
11. 1-(2',4'-dichlorophenyl)-pentyl acid succinate.
12. Cyclohexyl, p-chlorophenyl carbinol acid succinate.
13. Cyclopentyl, p-chlorophenyl carbinol acid succinate.
14. 1-p-chlorophenylpentyl acid glutarate.
15. 1-p-bromophenylpentyl acid succinate.
16. 1-p-chlorophenylhexyl acid succinate.
17. 1-(4-diphenylyl)-propyl acid succinate.

References Cited in the file of this patent

UNITED STATES PATENTS

| | | |
|---|---|---|
| 2,449,877 | Carswell et al. | Sept. 21, 1948 |
| 2,934,516 | Hicks | Apr. 26, 1960 |

FOREIGN PATENTS

| | | |
|---|---|---|
| 513,818 | Great Britain | Oct. 23, 1939 |
| 760,114 | Great Britain | Oct. 31, 1956 |
| 525,256 | Canada | May 22, 1956 |